United States Patent [19]
Nakamori et al.

[11] Patent Number: 4,502,769
[45] Date of Patent: Mar. 5, 1985

[54] QUICK-RETURN MIRROR DRIVING MECHANISM FOR SINGLE-LENS REFLEX CAMERAS

[75] Inventors: Masao Nakamori; Yasuo Ishiguro, both of Tokyo, Japan

[73] Assignee: Copal Company Limited, Tokyo, Japan

[21] Appl. No.: 473,628

[22] Filed: Mar. 9, 1983

[30] Foreign Application Priority Data

Mar. 11, 1982 [JP] Japan ................................ 57-38504

[51] Int. Cl.³ ............................................ G03B 19/12
[52] U.S. Cl. ..................................... 354/152; 354/153
[58] Field of Search ............... 354/152, 153, 156, 154, 354/155, 157, 158

[56] References Cited

U.S. PATENT DOCUMENTS 4,349,261  9/1982  Kurei ................................... 354/152

FOREIGN PATENT DOCUMENTS 57-205725  12/1982  Japan ................................. 354/153

Primary Examiner—John Gonzales
Attorney, Agent, or Firm—Cushman, Darby & Cushman

[57] ABSTRACT

A quick-return mirror driving mechanism for single-lens reflex cameras so formed that the release of a mirror-up operating member and the release of a mirror-down operating member are effected by a single electromagnetic means, in order to eliminate a mechanical connection between the shutter mechanism and quick-return mirror driving mechanism and, therefore, to simplify the mechanism as a whole.

4 Claims, 6 Drawing Figures

QUICK-RETURN MIRROR DRIVING MECHANISM FOR SINGLE-LENS REFLEX CAMERAS

BACKGROUND OF THE INVENTION (a) Field of the Invention

The present invention relates to an improvement of a quick-return mirror driving mechanism for single-lens reflex cameras.

(b) Description of the Prior Art

Generally, as a quick-return mirror driving mechanism equipped in a conventional single-lens reflex camera, such a type of mechanism wherein a mirror-up is effected by releasing a mirror-up operating member through a mechanical or electromagnetic means and a mirror-down is effected by a mirror-down operating member to be released by a mechanical means when the opening and closing movement of shutter blades has been completed is popular. In case of this type, it is necessary that the mechanical means are provided with sufficinetly large power and operating stroke to guarantee a proper operation. This requirement introduces such inconveniences as to make the design of driving mechanism difficult and the connection between a shutter mechanism and mirror driving mechanism troublesome at assemblage.

To delete this defect, a quick-return mirror driving mechanism of a type wherein the mirror-up operating member and mirror-down operating member are released by electromagnetic means respectively independent has been proposed, but this type of mechanism has such a defect that the mechanism becomes complicated and the manufacturing cost increases because it is necessary to prepare two sets of electromagnetic device and mechanical device related thereto.

SUMMARY OF THE INVENTION

The primary object of the present invention is to provide a quick-return mirror driving mechanism for single-lens reflex cameras without the above-mentioned defects.

This object, according to the present invention, is achieved by forming the mirror driving mechanism so that the mirror-up operating member and mirror-down operating member can be released by a single electromagnetic means.

Another object of the present invention is to provide such a mirror driving mechanism wherein the mechanical connection with the shutter mechanism is unnecessary and the formation is simplified, and, therefore, the decrease of weight of shutter blades is enabled.

A still another object of the present invention is to provide a mirror driving mechanism wherein the coupling with the shutter mechanism is easy at assemblage and the manufacturing cost is low.

These and other objects of the present invention will become apparent during the course of the following detailed description and appended claims.

DESCRIPTION OF THE PREFERRED EMBODIMENTS

Figure 1:
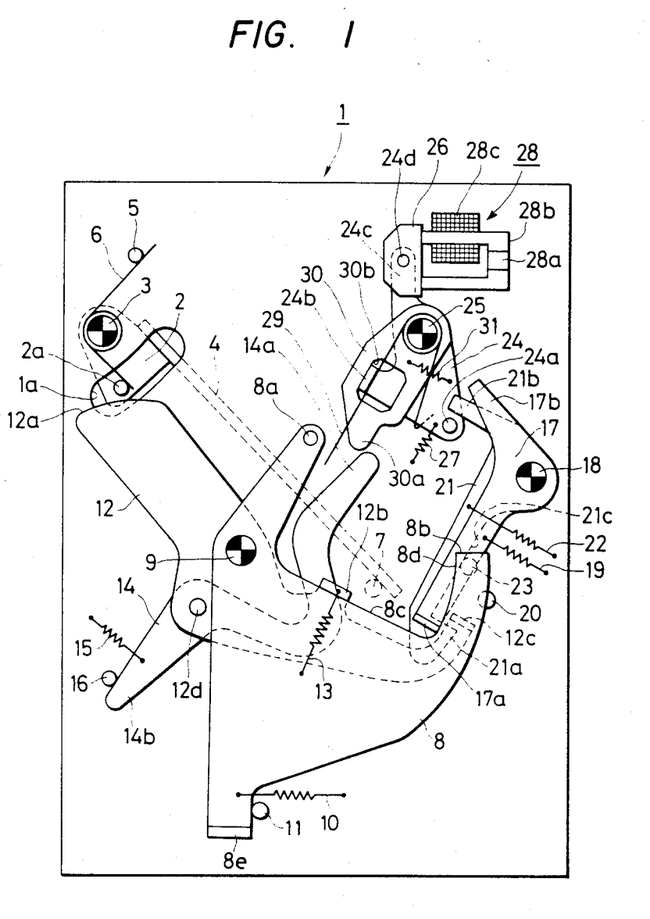
FIG. 1 is a side view showing an embodiment of the quick-return mirror driving mechanism according to the present invention being in the uncocked state.
Figure 2:
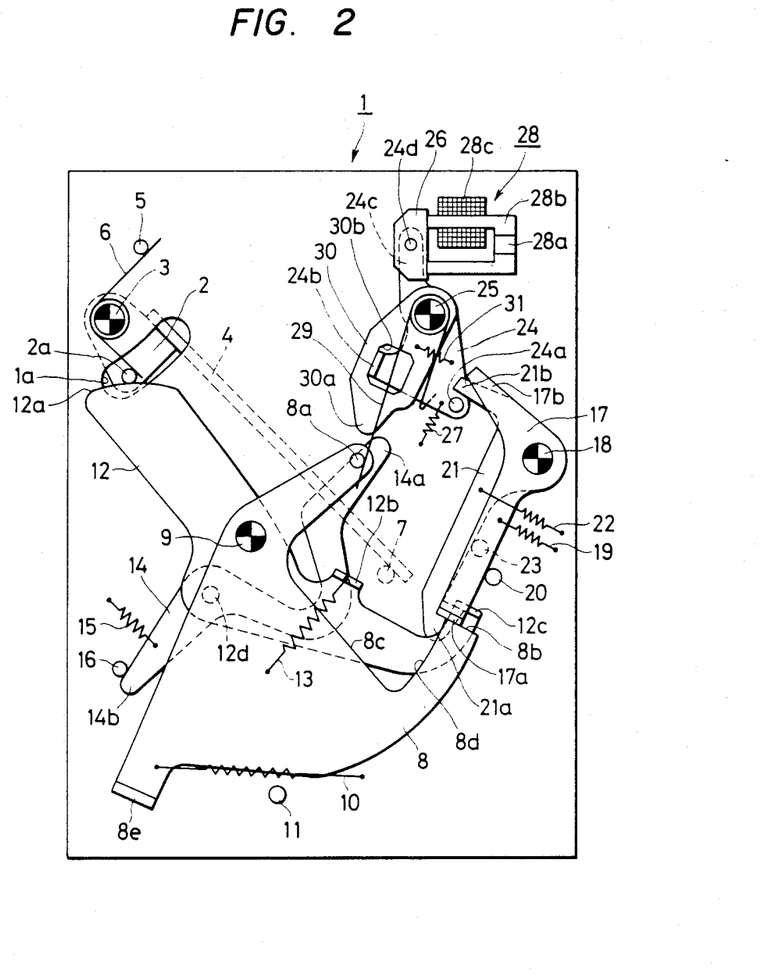
FIG. 2 is a side view of the mirror driving mechanism shown in FIG. 1 being in the cocked state.
Figure 3:
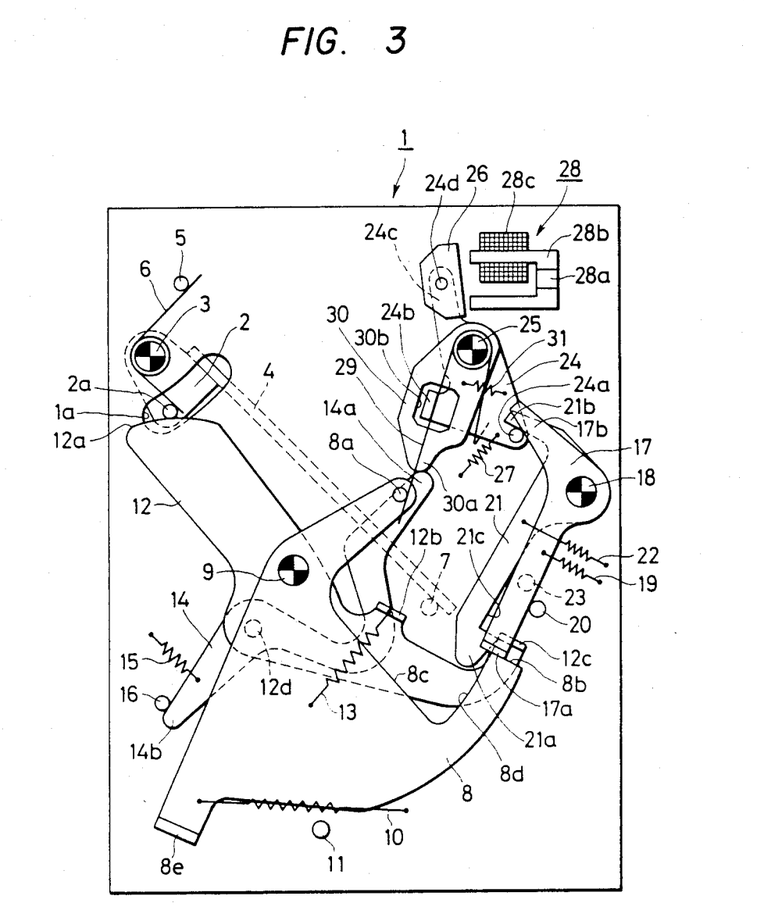
FIG. 3 is a side view of the mirror driving mechanism shown in FIG. 1 being in the state just before the mirror-up.
Figure 4:
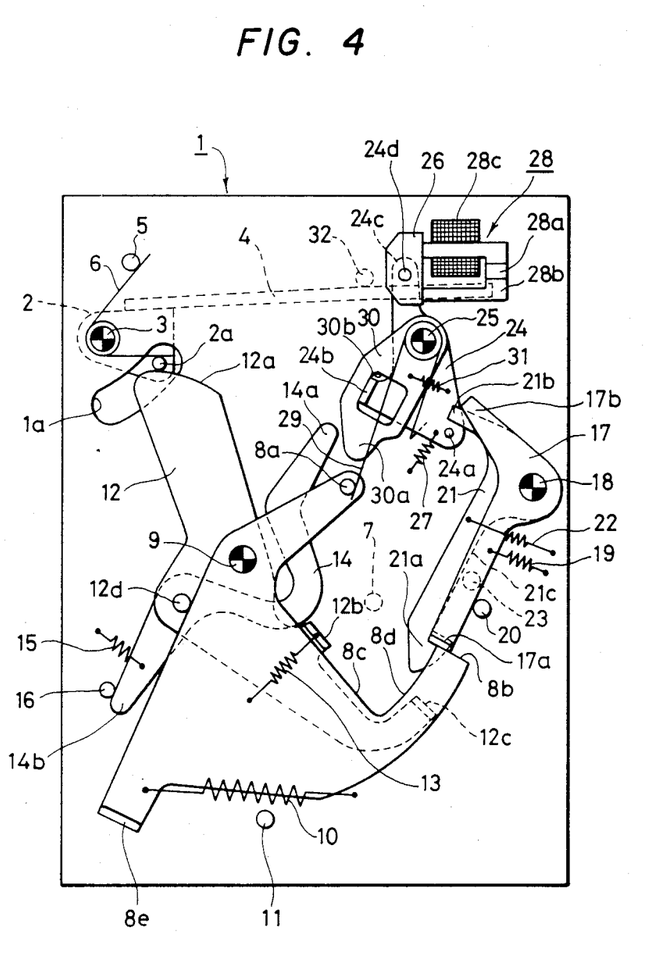
FIG. 4 is a side view of the mirror driving mechanism shown in FIG. 1 being in the mirror-up state.

Referring to FIGS. 1 through 4, reference numeral 1 is a side plate of a mirror box having a slot 1a and equipped in a camera body not illustrated, 2 is a mirror supporting arm rotatably supported on a shaft 3 mounted between a pair of side plates (only one of them is illustrated) 1, 1 facing each other with a predetermined distance and having a pin 2a protruded outward through the slot 1a, 4 is a rectangular reflecting mirror, one edge end thereof being fixed on the supporting arm 2, movable, within a pair of side plates 1, 1, between the position shown in FIG. 1 (the position capable of leading the light from an object to be photographed passed through a photographing lens to a finder optical system not illustrated) and the position shown in FIG. 4 (the position capable of leading the light from the object passed through the photographing lens to a film face not illustrated), 5 is a pin erected on the side plate 1, 6 is a spring wound on the shaft 3 and engaged with the pin 2a at one end and with the pin 5 at the other end to bias the mirror supporting arm 2 clockwise, 7 is a stopper erected on the back side of the side plate 1 to limit the clockwise rotation of the mirror 4, 8 is a mirror-down operating member rotatably supported on the side plate 1 by a shaft 9 and having a pin 8a, an end face 8b, side faces 8c and 8d and a bended portion 8e, 10 is a spring connected between the side plate 1 and mirror-down operating member 8 and biasing the mirror-down operating member 8 counter-clockwise, 11 is a stopper erected on the side plate 1 in order to limit the counter-clockwise rotation of the mirror-down operating member 8, 12 is a mirror-up operating member rotatably supported on the side plate 1 between the side plate 1 and mirror-down operating member 8 by the shaft 9 and having a cam face 12a engageable with the pin 2a, a bended portion 12b engageable with the side face 8c, another bended portion 12c and a pin 12d, 13 is a spring connected between the mirror-down operating member 8 and mirror-up operating member 12 in order to bias the side face 8c and bended portion 12b so as to engage with each other, 14 is a controlling lever rotatably supported on the under side of the mirror-down operating member 12 by the pin 12d and having arms 14a and 14b, 15 is a spring connected between the side plate 1 and controlling lever 14 in order to bias the controlling lever 14 clockwise, 16 is a stopper to limit the clockwise rotation of the controlling lever 14, 17 is a first lock lever rotatably supported on the side plate 1 by a shaft 18 and having a bended portion 17a engageable with the end face 8a and side face 8d and an arm 17b, 19 is a spring connected between the side plate 1 and first lock lever 17 in order to bias the first lock lever 17 counter-clockwise, 20 is a stopper erected on the side plate 1 in order to limit the counter-clockwise rotation of the first lock lever 17, 21 is a second lock lever rotatably supported between the side plate 1 and first lock lever 17 by the shaft 18 and having a hook portion 21a engageable with the bended portion 12c and an arm 21b, 22 is a spring connected between the side plate 1 and second lock lever 21 in order to bias the second lock lever 21 counter-clockwise, 23 is a stopper erected on the side plate 1 in order to limit the counter-clockwise rotation of the second lock lever 21, 24 is a first armature lever rotatably supported on the side plate 1 by a shaft 25 and having a pin 24a engageable with the arms 17b and 21b, a bended portion 24b, an arm 24c and a pin 24 d, 26 is an armature rotatably supported on the arm 24c by the pin 24d, 27 is a spring connected between the side plate 1 and first armature lever 24 in order to bias said lever 24 clockwise, 28 is an electromagnetic device secured on the side plate 1 and consisting of a permanent magnet 28a, yoke 28b comprising therein said permanent magnet 28a and having an end face able to contact with the armature 26 and an energizing coil 28c wound on said yoke 28b, 29 is a spring wound on the shaft 25 and engageable with the arm portion of the first armature lever 24 adjacent to the pin 24a at one end and engageable with the pin 8a and bended portion 24b at the other end, 30 is a second armature lever rotatably supported on the upper side of the first armature lever 24 by the shaft 25 and having an end portion 30a engageable with the arm 14a and a rectangular opening 30b engageable with the bended portion 24b, and 31 is a spring connected between the first armature lever 24 and second armature lever 30.

Next, the operation of the above-mentioned device shall be explained.

When a shutter not illustrated is cocked to prepare for a photographing, the mirror-down operating member 8 is, in connection with the cocking operation, rotated clockwise from the position of FIG. 1 against the spring 10. When the mirror-down operating member 8 is rotated by the predetermined amount in such manner, the end face 8b is engaged with the bended portion 17a of the first lock lever 17 and, thereby, the mirror-down operating member 8 is held in the cocked position. In this case, the mirror-up operating member 12 tends to rotate clockwise through the spring 13 together with the mirror-down operating member 8, but, when it is slightly rotated clockwise, the spring 13 is tensioned because the bended portion 12c is locked by being engaged with the hook 21a of the second lock lever 21. On the other hand, the spring 29 is tensioned in this process by the pin 8a being engaged with the end portion of the spring 29. The spring 29 tensioned in this way tends to make the first armature lever 24 rotate counter-clockwise against the spring 27, but the lever 24 will not move because the armature 26 is, in this stage, attracted to the yoke 28b by the permanent magnetic field of the electromagnetic device 28. Therefore, the second armature lever 30 will not move, too. By the above-mentioned slight and clockwise rotation of the mirror-up operating member 12, the cam face 12a touches the pin 2a and the controlling lever 14 is slightly rotated clockwise. In this way, each element will be in such a status as shown in FIG. 2.

Next, when a release button of a camera not illustrated is pressed down in the cocked state shown in FIG. 2, a pulse electric current is supplied for a moment to the energizing coil 28c from a well-known exposure time controlling circuit not illustrated. In this case, as the pulse electric current is supplied to such direction that the permanent magnetic field by means of the permanent magnet 28a is cancelled by a produced electromagnetic field, the attracting power of the electromagnetic device 28 disappears and, therefore, the first armature lever 24 is rotated counter-clockwise against the spring 27 by the spring 29 until the bending portion 24b is again engaged with the spring 29. The second lock lever 21 is rotated clockwise through the pin 24a by this movement of the first armature lever 24 and the mirror-up operating member 12 is consequently released. In this case, the end portion 30a of the second armature lever 30 is stopped by being engaged with the arm 14a of the controlling lever 14. By the stop of the second armature lever 30, the counter-clockwise rotation of the first armature lever 24 is finished under the mutual action of the springs 27, 29 and 31, but, at this time, the first armature lever 24 does not arrive at the position capable of rotating the first lock lever 17 clockwise. That is, when the second lock lever 21 is rotated clockwise by the first armature lever 24 in order to release the mirror-up operating member 12, the stop of counter-clockwise rotation of the first armature lever 24 is effected extremely soft and accurate since the spring constants of the springs 27, 29 and 31 are so selected that the power to make rotate the first armature lever 24 clockwise by means of the springs 27 and 31 is larger than the power to make rotate the first armature lever 24 counter-clockwise by means of the spring 29.

In this way, the mirror-up operating member 12 is rotated clockwise by means of the spring 13 from the position of FIG. 3 to the position wherein the bended portion 12b arrives to re-engage with the side face 8c. By this clockwise rotation of the mirror-up operating member 12, the reflecting mirror 4 is rotated counter-clockwise together with the mirror supporting arm 2 against the spring 6 through the cam face 12a and pin 2a and is stopped at the position shown in FIG. 4 by the stopper 32 erected on the back side of the side plate 1. On the other hand, because the arm 14a of the controlling lever 14 makes, in this process, the second armature lever 30 rotate clockwise by being engaged with the end portion 30a, the first armature lever 24 is also rotated clockwise by means of the springs 27 and 31. In this stage, as only permanent magnetic field exists in the electromagnetic device 28, the armature 26 is attracted to the end face of the yoke 28a. In this way, only the second armature lever 30 is rotated clockwise after the clockwise rotation of the first armature lever 24 has been stopped, but, as the side face of the arm 14a passes by sliding on the end portion 30a of the second armature lever 30 in the last stage of this movement of the controlling lever 14, the controlling lever 14 results in coming off from the second armature lever 30. Therefore, the second armature lever 30 is rotated counter-clockwise by the spring 31 as far as the position wherein the left side edge of the opening 30b re-engages with the bended portion 24b of the first armature lever 24 and the relative position between the arm 14a and second armature lever 30 becomes as shown in FIG. 4.

After the mirror 4 has been sprung up as shown in FIG. 4, the shutter blades not illustrated are opened and the exposure starts, and then the shutter blades are closed by the signal transmitted again from the exposure time controlling circuit when a proper exposure time has lapsed. At this moment, as the energizing coil 28c is again supplied for a moment with a pulse electric current from the exposure time controlling circuit, the first armature lever 24 is, as described before, rotated counter-clockwise against the spring 27 by the spring 29. In this case, as the second armature lever 30 is not deterred by the controlling lever 14, the second armature lever is rotated counter-clockwise together with the first armature lever 24 and the first armature lever 24 results in being rotated still further. Therefore, the second lock lever 21 as well as the first lock lever 17 is rotated clockwise through the pin 24a and, consequently, the mirror-down operating member 8 is released. Accordingly, the mirror-down operating member 8 is rotated counter-clockwise by the spring 10 from the position of FIG. 4 to the position of FIG. 1. By this counter-clockwise rotation of the mirror-down operating member 8, the mirror-up operating member 12 is rotated counter-clockwise together with the mirror-down operating member 8 and, therefore, the reflecting mirror 4 is rotated clockwise by the spring 6 together with the supporting arm 2 and arrives at the position of FIG. 1. On the other hand, in this process, the spring 29, as the pin 8a separates from the end portion of the spring 29, results in being engaged again with the bended portion 24 and the force of the spring 29 tending to rotate the first armature lever 24 counter-clockwise disappears. Therefore, the first armature lever 24 is rotated clockwise by the spring 27 and the armature 26 is attracted to the end face of the yoke 28a by the permanent magnetic field of the electromagnetic device 28. At this time, the second armature lever 30 is rotated clockwise together with the first armature lever 24, but, in this process, the end portion 30a engages with the arm 14a of the controlling lever 14 and passes thrusting said arm 14a against the spring 15, and the relative position between the controlling lever 14 and second armature lever 30 becomes again as shown in FIG. 1. In this way, the whole of one round operation completes.

Figure 5:
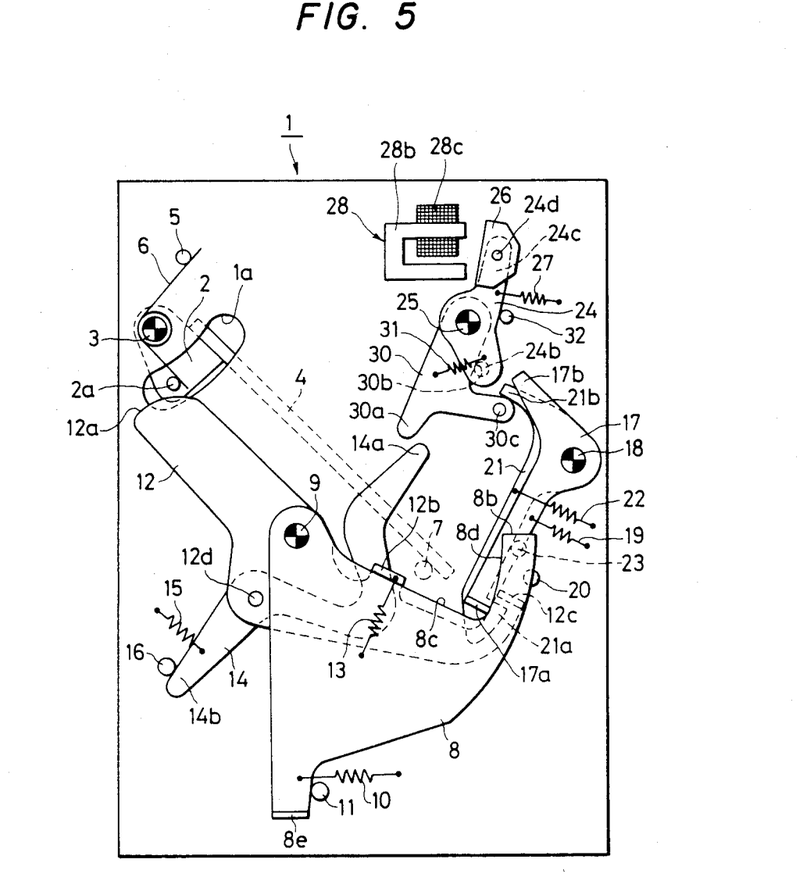
FIG. 5 is a side view showing another embodiment of the quick-return mirror driving mechanism according to the present invention being in the same state as of FIG. 1.

In the above, the embodiment so formed that the electromagnetic device 28 includes the permanent magnet 28a and the mirror-up and mirror-down are effected by the movement wherein the armature 26 separates from the end face of the yoke 28b is described, but it may so formed that the mirror-up and mirror-down are effected by the movement wherein the armature 26 is attracted for a moment to the end face of the yoke 28b. FIG. 5 is showing another embodiment formed so in the same status as of FIG. 1. The embodiment shown in FIG. 5 has a formation substantially same as that of the afore-mentioned embodiment except that the mirror-down operating member 8 does not have the pin 8a, that, when the energizing coil 28c is supplied with a pulse electric current, the armature 26 is attracted to the end face of the yoke 28b and the first and second armature levers 24 and 30 are rotated counter-clockwise and that the spring 29 does not exist and a stopper 32 to limit the clockwise rotation of the first armature lever 24 is erected on the side plate 1, and, therefore, the detailed description of the formation and operation thereof will be omitted making it sufficient to afford the same numerals to the parts and portions functionally same as those shown in FIG. 1.

Figure 6:
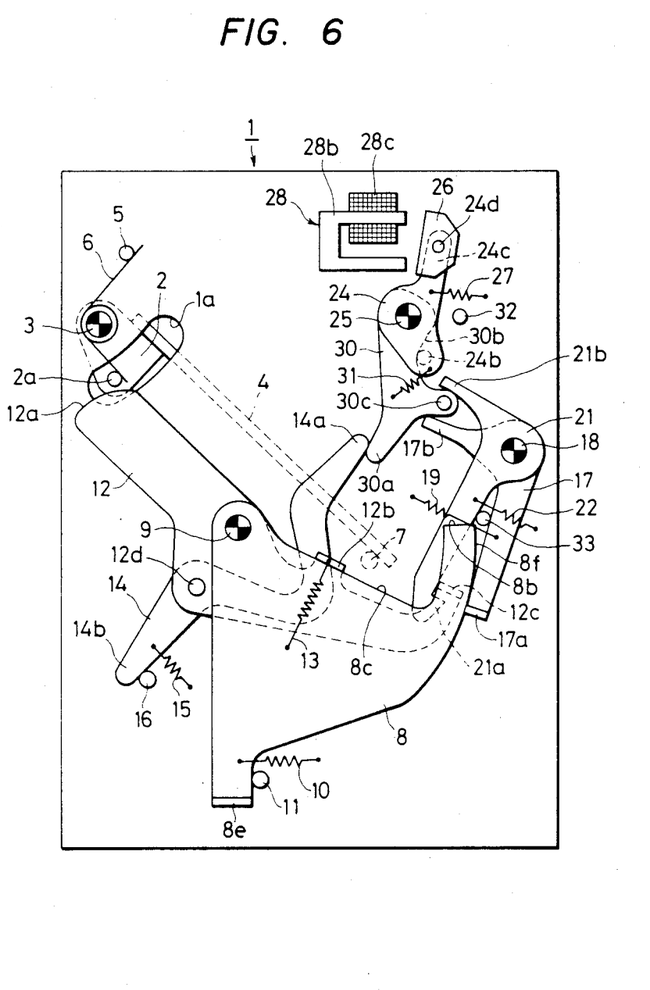
FIG. 6 is a side view showing still another embodiment of the quick-return mirror driving mechanism according to the present invention being in the same state as of FIG. 1.

In either case of the above-mentioned embodiments, the electromagnetic device 28 is supplied with a pulse electric current for an instant at the camera release button operation and at the shutter closure and the mirror-up operation and mirror-down operation are effected thereby, but the mirror-up operation and mirror-down operation may be effected by supplying the electric current to the electromagnetic device 28 continuously from the moment of release button operation to the moment of shutter closure. FIG. 6 is showing an embodiment formed so in the same status as of FIG. 5. The embodiment shown in FIG. 6 is so formed that the controlling lever 14 is biased counter-clockwise by the spring 15 and the counter-clockwise rotation thereof is limited by the stopper 16 and has a formation substantially same as the embodiment shown in FIG. 5 except that, when the mirror-up operating member 12 is released, the tip portion of arm 14a of the controlling lever 14 moves leftwards from the end portion 30a of the second armature lever 30 and, thereby, the full clockwise rotation of the second armature lever 30 is allowable, that, in the uncocked state, the first and second armature levers 24 and 30 are able to be stopped by the controlling lever 14 at the intermediate position of their full clockwise rotation stroke, that, when the first lock lever 17 is biased clockwise by the spring 19 and the mirror-down operating member 8 is rotated clockwise, the bended portion 17a moves engaging with an outer side face 8f of the mirror-down operating member 8 and engages with the end face 8b, and when the armature 26 is released by the de-energized electromagnetic device 28, the mirror-down operating member 8 is able to be released by being rotated counter-clockwise through the pin 30 and that the clockwise rotation of the first lock lever 17 and the counter-clockwise rotation of the second lock lever 21 are able to be limited by means of a pin 33 erected on the side plate 1, and, therefore, the detailed description of the formation and operation thereof will be omitted here making it sufficient to afford the same numerals to the parts and portions functionally same as those shown in FIG. 5.

We claim:

1. In a quick-return mirror driving mechanism for single-lens reflex cameras comprising a side plate to form a mirror box, a reflecting mirror rotatably supported on said side plate and capable of moving between the down position and up position, a mirror-up operating member rotatably supported on said side plate and engageable with said reflecting mirror, and capable of moving between the cocked position to permit said reflecting mirror to be held in the down position and the uncocked position capable of bringing said reflecting mirror to the up position and a mirror-down operating member rotatably supported on said side plate and engageable with said mirror-up operating member and capable of moving between the uncocked postion and the cocked position capable of bringing said mirror-up operating member to the cocked position, an improvement comprises a first lock lever rotatably supported on said side plate and engageable with said mirror-down operating member and capable of locking said mirror-down operating member in the cocked position, a second lock lever rotatably supported on said side plate and engageable with said mirror-up operating member and capable of locking said mirror-up operating member in the cocked position, a first armature lever rotatably supported on said side plate and rotatably supporting thereon an armature and engageable with said first and second lock levers, a second armature lever rotatably supported on said side plate and operatively connected with said first armature lever, and a single electromagnetic device secured on said side plate and capable of making said armature attract thereto; said second lock lever being moved by said first armature lever through the first change of status of said electromagnetic device caused when a camera release button is pushed down, to unlock said mirror-up operating member; and said first lock lever being moved by said first armature lever through the second change of status of said electromagnetic device caused when the shutter closes, to unlock said mirror-down operating member.

2. A quick-return mirror driving mechanism according to claim 1, wherein said electromagnetic device consists of a yoke including therein a permanent magnet and an energizing coil wound on said yoke, and said first and second changes of status are caused respectively by a pulse electric current supplied to said energizing coil for an instant.

3. A quick-return mirror driving mechanism according to claim 1, wherein said electromagnetic device consists of a yoke and an energizing coil wound on said yoke, and said first and second changes of status are caused respectively by a pulse electric current supplied to said energizing coil for an instant.

4. A quick-return mirror driving mechanism according to claim 1, wherein said electromagnetic device consists of a yoke and an energizing coil wound on said yoke, and said first change of status is caused by the supply of electric current to said energizing coil and said second change of status is caused by the interruption of the electric current to said energizing coil.

* * * * *